United States Patent [19]

Macedo et al.

[11] 3,938,974

[45] Feb. 17, 1976

[54] METHOD OF PRODUCING OPTICAL WAVE GUIDE FIBERS

[76] Inventors: Pedro B. Macedo, 6100 Highboro Drive, Bethesda, Md. 20034; Theodore A. Litovitz, 904 Devere Drive, Silver Spring, Md. 20903

[22] Filed: Apr. 22, 1974

[21] Appl. No.: 462,481

Related U.S. Application Data

[63] Continuation-in-part of Ser. No. 355,164, April 27, 1973, abandoned.

[52] U.S. Cl. .................. 65/3 R; 65/30 R; 65/60 D; 65/DIG. 7; 427/163
[51] Int. Cl.² C03C 17/02; C03C 15/00; G02B 5/14
[58] Field of Search .............. 65/DIG. 7, 3, 4, 31, 2, 65/60, 30 R; 427/163

[56] References Cited
UNITED STATES PATENTS

| | | | |
|---|---|---|---|
| 2,106,744 | 2/1938 | Hood et al. | 65/31 X |
| 3,380,817 | 4/1968 | Gardner | 65/31 X |
| 3,549,524 | 12/1970 | Haller | 210/31 |
| 3,611,188 | 10/1971 | Snitzer et al. | 65/DIG. 7 |
| 3,647,406 | 3/1972 | Fisher | 65/3 X |
| 3,737,292 | 6/1973 | Keck et al. | 65/DIG. 7 |
| 3,792,987 | 2/1974 | Eaton | 65/31 |

*Primary Examiner*—Robert L. Lindsay, Jr.
*Attorney, Agent, or Firm*—Laurence, Stokes & Neilan

[57] ABSTRACT

Procedures are disclosed for producing both core-cladding optical fibers and self-focusing optical fibers from porous germinate and/or silicate glasses obtained after phase separation and removal of the soluble phase. A glass which is separable into at least two phases one of which is soluble, is heated to cause phase separation. The soluble phase is leached out removing undesired impurities. The pores are collapsed and this glass is used to produce cores and/or cladding layers, or self focusing fibers. According to one aspect of the invention, preforms of the porous glass have their interconnected pores stuffed with a dopant. In the production of core-cladding optical fibers, the dopant modifies the index of refraction of the core and/or cladding so that the index of refraction of the core is greater than that of the cladding. The control of this index of refraction can be accomplished by addition of non silicate network formers such as $GeO_2$ to the original melt before phase separation. These network formers will stay in the insoluble phase. In producing self-focusing fibers, the dopant may be non-uniformly deposited in order to produce a radial gradient in the index of refraction, or sodium or potassium ions may be ion exchanged into the glass for a portion of a dopant containing lithium or thallium to produce such an index of refraction gradient.

29 Claims, No Drawings

METHOD OF PRODUCING OPTICAL WAVE GUIDE FIBERS

The invention herein described was made in the course of or under a contract or subcontract thereunder (or grant) with the Department of the Air Force.

CROSS REFERENCE TO RELATED APPLICATION

This application is a continuation in part of our copending application Ser. No. 355,164 filed Apr. 27, 1973, now abandoned.

BACKGROUND OF THE INVENTION

The present invention relates to glass fiber optical wave guides useful in a laser communication or data transmission system.

The most promising transmitting media for optical communication signals is the glass fiber optical wave guide. In an optical wave guide the light beam is confined within and guided along a solid glass fiber of cylindrical cross section with a plurality of fibers assembled into a bundle and protected with a sheathing so that the wave guide can be handled much like a cable. The individual fibers are generally formed of a central glass core surrounded by a glass cladding which has a lower refractive index than the core so that a light beam injected into one end of the compound fiber is confined to and guided along the core by total internal reflection. The fiber cores range in diameter from approximately 1 to 100 micrometers and typical cladding-core diameter ratios are on the order of 1.1 to 1.

Another type of glass fiber optical wave guide, which is referred to as a self-focusing fiber, has a radially parabolic refractive index profile created within the glass fiber. The variation in the refractive index is intended to cause the light beam to be continuously focused or guided along the filament. The desired refractive index profile is sought to be achieved by ion exchange techniques in which, for example, thallium ions in the glass fiber near the surface are replaced by sodium or potassium ions. In the latter type of wave guide, it is quite difficult to achieve the desired distribution of the ions, and unduly long ion exchange times are required when following prior art ion exchange procedures.

The preferred glass compositions for optical fibers are generally silicates. The raw materials from which the glass compositions are obtained can be in various forms such as oxides and carbonates, but must be of high purity. Specifically, transition metals such as ferrous ion, nickel and chromium should be essentially completely excluded, and preferably are present in an amount of less than 2 parts per billion.

In the production of the fibers, a melt is prepared and the fiber is drawn either using the standard double crucible technique used for pulling fibers, or from preforms made of tubes and rods of appropriate dimensions to be used in the preform technique for preparing glass fibers (e.g., A. D. Pearson and A. R. Tynes, "Light Guidance in Glass Media." American Ceramic Soc. Bull. 49, 969–973 (1970).

When preparing a self-focusing fiber, the drawn fiber may be passed directly into a molten salt bath for the ion exchange treatment.

At the present time, an important problem to be solved in adapting glass fiber optical waveguides for use as a transmission line in communications systems which extend over long distances is the need to produce low signal loss silicate fibers by relatively inexpensive commercial production processes. One of the problems faced is to reduce loss due to extrinsic absorption which is absorption due to the presence of molecular or ionic impurities, especially $Fe^{++}$ ions and other transition elements. Production processes seeking to alleviate this problem are made much more expensive and complicated by efforts to keep out or remove the iron impurities from the silicate glasses. The iron gets into the glass both from the raw materials and in the melting procedure.

The methods proposed thus far to avoid this problem can be quite costly. An example of this is the vapor deposition technique. (See Keck et al, U.S. Pat. No. 3,711,262 on vapor deposition.)

SUMMARY OF THE INVENTION

It is a primary object of this invention to provide a method for economically producing an optical wave guide which overcomes the disadvantages noted above.

Another object is to provide novel techniques useful for producing core-clad as well as self-focusing fibers.

Still another object of the invention is to provide optical wave guide fibers which cause low extrinsic absorption losses.

According to the present invention, optical wave guide fibers are produced from a silicate glass, such as certain germania borosilicate glasses, which upon heating, can be separated into a germania silica-rich phase and a germania silica-poor phase. The latter phase is dissolved to leave a porous glass comprised of the germania silica-rich phase. We have found that iron and other impurities can be removed along with the silica-poor phase to, in effect, purify the glass.

One process of phase separation and leaching has been described in detail in Hood et al U.S. Pat. No. 2,221,709. This process has been used for many years to produce glass called Vycor which is useful for chemical ware. If one follows the process described in the Hood et al, patent, a core useful for certain applications can be made. This type of core must then be coated with a clad material having a lower refractive index. Because this Vycor core has a rather low index itself the clad materials are limited to plastics and low index inorganic glasses. Because the commercial Vycor process yields a glass containing significant amounts of water, the final product is partially immiscible, which leads to added scattering loss and an extremely high absorption (owing to OH vibrations) at 0.95 $\mu$m (of the order of 2500 dB/km). In addition to the water problem the process does not either remove all the transition elements or put them in the proper oxidation state which yields absorption values due to impurities lying above 400 dB/km at 0.59 $\mu$m and 2000 dB/km at 1.05 $\mu$m.

By using starting materials of higher purity than used in the commercial process and by paying greater attention to the removal of water this attenuation can be made low enough for many applications. But with certain modifications to the above process which we have discovered glasses can be obtained (which we call phasil) in which the absorption and scattering losses are substantially reduced becoming comparable to that of pure silica. They are thus useful for all applications. In addition by varying the initial composition of the starting materials such as partial substitution of germania for silica the index of refraction of the final glass can be controlled over significant ranges.

This ability to adjust the index of refraction allows considerable increase in the flexibility of optical design. For example, glass treated by our process can be used for either the core or clad or both. This can be done with acceptance angles considerably larger than the optical fibers now commercially available using the chemical deposition techniques.

An important aspect of this invention is the discovery of the utility of the unconsolidated porous glass as a step in the process of production of optical fibers. This porous state of this glass is utilized in several ways as described below: (1) because of the large surface to volume ratio oxidation-reduction of the remaining transition elements can be accomplished with great efficiency; (2) for the same reason remaining water which is chemically bonded to the glass can be removed; and (3) dopants can be added to the pores for control of index of refraction and other physical properties.

In the case of a core-cladding type of wave guide, the dopant may be added to the cladding and/or core to obtain a composite fiber in which the index of refraction of the core exceeds that of the cladding.

In producing self-focusing fibers, which require a radial variation in the index of refraction, the dopant may be added nonuniformly to obtain this radial variation or if added approximately uniformly, a portion of the dopant may be selectively removed to obtain the desired index variation. The amount of refraction variation which can be achieved is greater than heretofore possible using ion exchange techniques. Ion exchange techniques can be employed only with a limited number of elements whose ions can be exchanged (e.g., Tl, Li, Na, K, Ru, Cs, Ag). In the present invention, there is no limit, in so far as the stuffing procedure is concerned, upon the atoms which can be used as dopants (e.g., Ge and Pb can cause over twice the change in the index of refraction possible by ion exchange). $GeO_2$ or other network formers can be added in the original melt or as a dopant into the pores. If added to the original melt they will be purified by the Phasil process and will result in a uniform change in index of refraction. If added as a dopant to the pores, it must be of higher purity but has the advantage of being able to yield radial variation in the index of refraction. Alternatively, sodium or potassium ions may be ion exchanged for a portion of certain dopants to obtain the radial variation in the index of refraction.

An overall process for producing a porous glass and then adding dopant and forming an optical fiber may be characterized as including (1) forming a rod or tube of desired dimensions from an intermediate borosilicate glass, (2) thermally heating the rod or tube for a period of time to separate the glass into a silica-rich and a silica-poor phase with a controlled microstructure size, and interconnectivity, (3) dissolving or leaching the silica-poor phase with a mineral acid, (4) when necessary cleaning the residues remaining in the pores thus created using NaOH or dilute HF, (5) when necessary treating pores with aqua Regia to remove any platinum inclusions, (6) stuffing the pores if desired with iron-free dopants, (7) drying, (8) thermally consolidating the porous bodies (for example, a rod as above inside of a treated tube or rods or tubes alone), (10) then heating and pulling this preformed structure into a fiber of desired diameter, and (11) this fiber, according to one embodiment, then can be passed through a molten salt bath where ion exchange takes place with the dopant.

These steps (1) through (4) are used to create a silica matrix with a desired index of refraction and sufficiently iron free for optical fiber use. Step (5) solves a major problem of light scattering out of the fiber owing to platinum inclusions.

The next four steps allow one to inexpensively introduce transition element free dopants into the glass by (a) (step 6), introduction of the dopant into the pores as distinguished from into the silica matrix and (b) (step 8), heat treating in a controlled atmosphere at temperatures below the consolidation temperature effectively controlling the oxidation-reduction state of the remaining transition metal impurities, and (c) (step 9) thermal consolidation of the dopant into the silica matrix. We refer to steps (6) through (9) as molecular stuffing to distinguish it from ion exchange. In the stuffing process, the pores are not necessarily filled completely. Step (7) solves another important production problem; namely, the drying process, when done in a proper reactive atmosphere, allows removal of protons, not only from pores, but also (because of large ratio of surface to volume) from the glass matrix itself.

Either by control of the original melt composition and/or by the stuffing approach one can create rods and tubes with a uniform but controlled index of refraction so that they can be then used in a preform to make a core-clad fiber where the core has a higher index of refraction than the clad. Additionally, controlled diffusion or other means allow stuffing of the pores in the silica matrix in a non-uniform way such that, for example, the dopant concentration (e.g., $B_2O_3$ or $Al_2O_3$) varies radially outwardly from the center to the outer surface of a fiber. This variation in dopant concentration will, after consolidation by heat treatment which closes the pores, be permanent and lead to a radial variation in index of refraction. The radial variation of index of refraction thus obtained comes about through a totally different mechanism than by ion exchange processes in which ions are exchanged into the glass matrix, e.g., Kitano et al, U.S. Pat. No. 3,650,598. Whereas in conventional ion exchange processes, a very limited number of types of ions can be used, and whereas the extent of ion exchange is limited by the number of ions already present in the matrix, the stuffing process of the present invention is limited only by the pore volume, which is approximately 50% of the total volume.

The present invention takes advantage of the fact that the phase separated regions are interconnected and thus diffusion is possible into every part of the porous glass structure. The heat treatment which results in phase separation can be used to control pore size and thus diffusion rates (see Haller U.S. Pat. No. 3,549,524).

DETAILED DESCRIPTION OF THE INVENTION

In practicing the instant invention, a porous medium is prepared from a suitable phase separable base glass such as a base glass having a composition which lies in a known limited region of the pseudo-ternary system $R_xO.B_2O_3.QO_2$ which region includes those compositions which will separate by heat treatment into at least two phases, one of which is easily decomposable and the other substantially undecomposable. The term $QO_2$ means silica or germania or any combination thereof. The term $R_xO$ means any of the alkaline earth, alkali metal or heavy metal oxides wherein $R_xO$ can be $Li_2O$, $Na_2O$, $K_2O$, $Tl_2O$, $CaO$, $BaO$, $MgO$, $BeO$, $SrO$ $PbO$ or $ZnO$, or any combination thereof, and $x$ is 1 or 2, depending on the valence of the metal R. Advantageously, the base glass composition can, for instance, be of the type described in Hood et al. U.S. Patent Nos. 2,106,744 and 2,215,039. It is important that the mixture of oxides chosen displays a miscibility gap, i.e., that the melt of the oxides, when above a predetermined temperature, is a substantially homogeneous liquid, and, when below said predetermined temperature, segregates into at least two immiscible liquids. In addition to the mixture of oxides chosen displaying such a miscibility gap, it is also important that the volume ratio of the phases be between 1:2 and 2:1, and that the chemical durability of each phase differs sufficiently to permit selective leaching. Representative suitable mixtures of oxides include base glass compositions where silica is present in amounts ranging from 40 to 83 to weight percent, the $R_xO$, e.g., soda, potash, lithia, etc., is present in amounts ranging from about 2 to 10 percent, and the boric oxide is present in amounts from about 8 to 48 weight percent. The iron content in the raw materials should be kept to less than 10 parts per million.

In addition to the borosilicate glass described above many other glasses e.g., 5–20% $Li_2O$ and 80–95 $SiO_2$, or 5–15% $Na_2O$ and 85–95% $SiO_2$ exhibit a miscibility gap and can be used.

Also we have found that from 0 – 20% weight percent of germania, $GeO_2$, or other network forming oxides can be substituted for part of the silica in the base glass.

The process of producing the interconnected phase separated glass structure and its consolidation can be divided into the following steps:
a. glass melting, (b) phase separation, (c) leaching, and (d) consolidation.

a. Glass melting:

A $Na_2O$-$B_2O_3$-$SiO_2$ composition is selected such that a homogeneous glass is easily made at 1400°C, i.e. the mixture has viscosity around $10^2$ to $10^3$ poise at 1400°C. Conventional glass melting procedures are used. A modification which we have applied is to add sodium nitrate. This helps oxidize all transition metal impurities to their highest oxidation state, which will facilitate their removal (see the following section). Another modification is to replace some of the $SiO_2$ with another network former such as $GeO_2$ in order to control the index of refraction if desired. For example adding 10% $GeO_2$ changes the index by 1%.

One preferred embodiment of the base glass would be

|  | Mol per cent. | |
|---|---|---|
|  | Broad | Preferred Range |
| $SiO_2 + GeO_2$ | 40 – 80 | 45 – 70 |
| $B_2O_3$ | 15 – 50 | 20 – 40 |
| Alkali ($Na_2O$) | 4 – 11 | 4 – 9 |
| $Al_2O_3$ | 0 – 5 | 0 – 3 |

The preferred range contains 0 – 20% $GeO_2$.

b. Phase separation:

Depending on the starting composition the glass is heat treated at a temperature from about 500°C to 650°C from a few seconds to several weeks such that it separates into two phases having totally interconnected microstructure with an average size (100 – 2000 A) preferably between 100 – 500 A. These dimensions are much smaller than the radius of the preform. Thus, when the preform is undergoing the thermal consolidation step, the rates of diffusion are such that the dopant described below is homogeneously incorporated into the silica matrix on the dimensions of the microstructure, yet variations in dopant concentration can occur over distances on the order of the preform radius.

Considerable study of the kinetics of phase separation in the $Na_2O$-$B_2O_3$-$SiO_2$ system has allowed us to maximize the interconnectivity in that size range and to make a judicious choice of the composition selection. One of the phases is mostly covalently bonded $SiO_2$ and will be referred to as the 'hard' phase. The other phase has most of the sodium and boric oxides of the original glass with considerably less silica than in the hard phase. It is predominantly ionic in nature and will be referred to as the 'soft' phase. It has been found advantageous to heat treat the glass at as low a temperature as possible. This reduces the possibility of any deformation of the rod or tube due to viscous flow. Also it increases the difference in composition of the two phases. When $GeO_2$ or other network formers are added they go mainly into the hard phase.

The ionic impurities in the glass are preferentially segregated into the soft ionic phase. After leaching out this soft phase a reduction of absorption loss occurs owing to the preferential distribution of transition elements during phase separation. This preferential distribution of the ionic impurities increases if they are oxidized to their highest valence state (due to the increased ionic strength of the impurities). Therefore oxidation of iron in the glass melt facilitates its removal. Moreover this reduces the amount of ferrous ion that is chiefly responsible for the absorption loss in the 1 $\mu$m frequency range. We have found it possible to reduce absorption loss at 1 $\mu$m from 5,000 dB/km to less than 100 dB/km.

c. Leaching;

The borosilicate glass in the form of tubing or rods is initially subject to an acid leaching treatment. Useful acids are dilute solutions, typically in the range of 1–2 normal solutions, of mineral acids, e.g., HCl, $H_2SO_4$, $HNO_3$. However, hydrofluoric acid should not be used since it dissolves the silica-rich phase. The temperature of the leaching bath is generally about 90°–100°C. with about 95°C. being preferred. As the temperature of the bath falls below 90°C. there is less thorough extraction and a substantial increase in the extraction time. Below 85°C., the rate of leaching becomes too slow. The leaching time is to some extent dependent upon the concentration of the acid and the temperature of the bath. A typical leaching schedule involves leaching the glass for two days in a 1.5 N solution of nitric acid at about 95°C., then rinsing in a fresh solution of the same acid strength, and finally rinsing in a dilute, 0.2 N, solution of nitric acid for one day.

Sometimes prior to leaching, it may be desirable to subject the glass to a preliminary etch treatment to remove the surface skin and thereby permit a more uniform penetration is recommended for thick walled tubing and also when the surface of the glass has become contaminated on storage. A typical preliminary etching may be performed by dipping in a 15 weight percent $NH_4F.HF$ solution for 10 minutes. Ordinarily, the silica-rich phase is retained while the silica-poor, or boron-rich phase is removed by leaching with an acid.

It has been found that the rigid pores of the resulting silica-rich phase skeleton are about half filled with colloidal silica which is a decomposition product of the removed microphase. It is often useful to remove this colloidal silica in order to remove transition elements which may have precipitated there. After washing the rigid, porous skeleton in an aqueous solution, the skeleton is treated with a solvent for the colloidal silica, preferably, a dilute solution of HF/HCl acids or sodium hydroxide, for a time sufficient to remove the colloidal silica without substantial attack of the skeleton itself. Ordinarily, the colloidal silica solvent treatment time will range from about one to four hours. After this is completed, the pores may be treated with hot, aqua Regia to remove any possible platinum inclusions which might be present. The acid treatments described above remove trace transition elements from both the silica gel and the surfaces of the matrix. Thereafter, the skeleton can be dried and the dried skeleton thus comprises a rigid matrix provided with a continuous system of intercommunicating pores substantially free of contaminants.

We have discovered that if $GeO_2$ is added to the melt composition in place of some of the $SiO_2$, sufficient $GeO_2$ remains in the hard phase (impervious to HCl leaching) that significant increases in the index of refraction can be achieved. This can be used to control the index of refraction of the phasil product over ranges which are higher and lower than the commercial Vycor product. Other network forming oxides can be used for this purpose.

d. Consolidation:

This step of the process consists of heating the sample to a range from 700°C. to 950°C. depending on the glass composition so that the pores of the glass close by viscous flow, leaving a homogeneous glass of the hard phase. We have discovered that if this consolidation is carried out as described in the Hood et al. patent a glass is obtained with a generally unacceptably high optical loss. (This point has been verified by measuring the loss of the commercially available product, Vycor). We have discovered further that the reason for this loss is incomplete removal of acid and water from the pores before collapse. We have found that if the glass is kept at 500°–700°C. for 15-50 hours before heating to the 700°–950°C range most of the inhomogeneities in the glass, caused by the presence of water can be removed. This drying process is carried out preferably in a reactive atmosphere (such as $CCl_4$, $Cl_2$ gas or $SiCl_4$).

In addition we have found that during the 500°–700°C. heat treatment the unconsolidated glass can be very efficiently controlled. This is due to the large surface available at this point. The value of this can be understood as follows. Although oxidation of the ionic impurities facilitates their removal in part b) above and lowers the absorption at 1μm owing for example to the remaining iron, if one wishes a low attenuation in the 0.6 μm region reduction reduction of the ionic impurities is useful. For example by reduction just before consolidation by heating porous glass for 14 hours in a vacuum we have appreciably lowered the attenuation from 250 dB/km. The exact effect of the oxidation-reduction treatment depends upon which ionic impurities are present in the porous glass.

EXAMPLE 1

To make the core of a core-clad preform, a melt is made of high quality chemicals (i.e. less than 10 ppm of total transition metal ions). 70 mole % $SiO_2$, 7 mole % $Na_2CO_3$ and 23 mole % $B_2O_3$ is melted in a platinum crucible at 1400°C. To this 0.1 % $NaNO_3$ is added as an oxidizing agent. The melt was then stirred until homogeneous. After refining a rod is drawn to 5 mm O.D. The rod is heat treated at 550°C. for 4 hrs. The microstructure had a size of about 500 A. Then the rod is leached for 72 hours in 3 normal HCl at 95°C. and then washed in deionized water. The water and acids must not introduce contaminants into the glass. The glass was further immersed in a 2% HF solution at 22°C. for 2 hours, treated with 3N HCl and then washed with water. The porous rod is dried to remove the bulk of the water and then heated to 550°C. to remove the remaining water. The rod is fired slowly to 850°C., a temperature sufficient to close the pores and convert the impregnated glass to a substantially homogeneous vitreous body. This rod is mounted on standard fiber pulling equipment, pulled into a fiber having an index refraction of about 1.46 and coated with a low index of refraction plastic by a procedure similar to that described in Applied Optics, Vol. 13, page 1 (1974).

EXAMPLE 2

This example illustrates making a core of a core-clad preform with a greater index of refraction than in Example 1 so that there is more freedom in selecting a cladding which must have an index lower than that of the core; melt made of high quality chemicals (i.e. less than 10 ppm of total transition metal ions) containing 58.2 mole % $SiO_2$, 10 mole % $GeO_2$, 25.4 % $B_2O_3$, 6.4 % $Na_2O$ is melted in a platinum crucible at 1400°C. To this 0.1 % $NaNO_3$ is added as an oxidizing agent. The melt is then stirred until homogeneous. After refining a rod is drawn to 3 mm O.D. The rod is heat treated at 550°C. for 4 hrs. The rod is then leached for 48 hours at 95°C. in 3N HCl and then washed with deionized water.

The resulting porous rod is dried first to remove the bulk of the water and then heated to 550°C. in a vacuum for 24 hours. The atmosphere is then changed to pure oxygen and the glass is kept at 550°C. for another 8 hours. Then the rod is brought to 850°C. until consolidation occurs. The rod is then inserted into a tube whose I.D. is approximately 3 mm and whose O.D. is 5 mm. The tube can be made either as in Example 1. (except in tube form and without the plastic coating) or a commercial tube made of fused silica or Vycor can be used. This composite is heated in a flame and drawn into a fiber. The core has an index of about 1.476 whereas a similar glass without the germania would have an index of about 1.460.

According to another preferred embodiment of the invention, the field of use of phase separable porous glasses in making optical fibers is extended by depositiong a dopant within the pores. Using stuffing we can lower the index of the clad to a more useful value. In practice, this can be done in many ways. According to one suitable method, the rod or tube of desired shape is impregnated by immersing it or a part of it in a solution containing a salt or compound of an element, the oxide of which is to be incorporated therein. The percentage of oxide to be incorporated may be controlled by varying the concentration of the treating solution. By knowling the composition, density and porosity of the porous glass, the concentration of the solution necessary to produce any desired final glass may be calculated. The porosity of the porous glass may be determined by the usual methods and in general amounts to about 50%. Highly soluble compounds are preferably employed and the solution is heated, if necessary, to increase the solubility. Some compounds tend to volatilize when their solutions are heated and in order to prevent this and to maintain the desired high concentration such solutions can be closed in a sealed container during the impregnating step.

The dopant is deposited in a form, for example, carbonates, nitrates or hydroxides, that upon heating, will yield the corresponding oxide. The preferred dopants are such compounds of alkali metals, alkali earths, boron, germanium, aluminum, titanium, lead, and bismuth that convert to the corresponding oxide during the thermal consolidation step. With the exception of boron oxide which lowers the index of refraction, the other oxides increase the index of refraction of the preform glass.

The dopant is preferably added in an amount of about 5-30 weight percent based on the weight of the unstuffed preform.

In the case of making a clad for use with a fused silica core, the index of refraction may be lowered by increasing the $B_2O_3$ content of the phase separated clad tube. For example, the porous tube for making the cladding is immersed into a saturated solution of ammonium borate. A fused silica rod is then inserted in the tube and the combination of rod and tube is then thermally consolidated.

Another example of the use of stuffing is in preparation of a preformed rod which has an appropriate uniform concentration of dopants and which after being drawn into a fiber will be ion exchanged.

In this case, the base glass and production steps are the same as that in the previous example but step (6), the stuffing step, differs. Here, one impregnates the porous rod with a colloidal solution of aluminum particles in LiOH. This yields a lithium-alumina-silicate glass which can be readily ion exchanged after fiber formation to produce a self-focusing fiber because the ion exchange process yields an index of refraction which varies radially from center to outer surface.

Another application of the stuffing process is to produce a self-focusing fiber by directly creating a preform whose index of refraction varies radially from center to outer surface and which when drawn into a fiber maintains this radial variation in index.

This can be done in many ways, for example, a colloidal suspension of an oxide dopant (e.g., $Al_2O_3$) can be diffused into the pores in a non-uniform fashion if the pores are of such a small size as to offer steric hindrance to the flow of suspended particles. The diffusion time history can be controlled to create the desired radial dependence in dopant concentration in the pores.

Another method would involve using two reactants which precipitate dopant on the walls of the pores and starting with a porous tube placing one reactant inside the tube and the other outside the tube. By adjusting hydrostatic pressures and concentrations as a function of time, the amount of precipitaiton will vary with radial distance from the inside wall.

After introducing dopant into the pores, a drying and consolidation is carried out as described above.

A specific example of the use of molecular stuffing to uniformly control the index of refraction of a preform is the following.

EXAMPLE 3

A melt is made of a high quality chemicals (i.e. less than 1 ppm of total transition metal ions). 70 mole % $SiO_2$, 7 mole % $Na_2CO_3$ and 23 % mole % $B_2O_3$ was melted in a platinum crucible at 1400°C., and stirred until homogenous. After refining a tube is drawn to 2 mm ID and 6 mm OD. The tube is heat treated at 580°C. for 100 hrs. The micro-structure had a size of about 800 A. A short hydrofluoric acid treatment is given to remove the thin layer of highly silicous glass at the surface of the tube. Then the tube is leached for 48 hours in 2 normal HCl at 95°C. The water and acids used must not introduce contaminants into the glass. The glass was further immersed in a 0.5 N NaOH solution at 22°C. for 6 hours, washed until neutral with water which had been passed through a millipore filter, and treated with cold 3N HCl. This porous tube is now immersed into a solution containing 1500 grams of boric acid, 700 cc of 28% concentrated ammonium hydroxide, and 1000 cc of water. The porous tube is dried and while being dried treated with carbon tetrachloride vapors to remove hydroxyl ions and then treated in an air atmosphere to remove any residual chlorine. A fused silica rod is inserted into this tube and the combination rod and tube preform is fired slowly to a temperature of about 850°C which is sufficient to close the pores and convert the impregnated glass to a substantially homogeneous vitreous body. Since the temperature at which this will occur will vary with the oxide or oxides introduced, no universal temperature for firing be stated but suitable temperatures may readily be determined by trial for other compositions. Temperatures of 800°–900°C. or higher are useable. In every instance it will be found to be materially lower than the temperature required to melt and refine a glass of equivalent composition directly from batch materials. This preform is then drawn into a core-clad fiber.

EXAMPLE 4

This example illustrates deposition of dopant by chemical vapor deposition.

The terakis-isopropoxide of Ge is first prepared by the method of Bradley and co-workers (D. C. Bradley and W. Wardlaw, J. Chem. Soc. 280 [1951]).

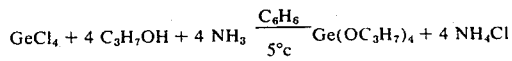

$$GeCl_4 + 4\ C_3H_7OH + 4\ NH_3 \xrightarrow[5°c]{C_6H_6} Ge(OC_3H_7)_4 + 4\ NH_4Cl$$

High purity 99.999% $GeCl_4$ should be used. The Ge-$(OC_3H_7)_4$ is further purified by use of a gas chromatographic column using 1% Apiezon L on Chromosorb W (60–80 mesh) injected at 20.3°C. in accordance with technique described by L. M. Brown, and K. S. Maziyasni, Analytical Chem. 41, 1243 (1969). The Ge-$(OC_3H_7)_4$ vapor effluent from the gas chromatograph column is then diffused into a porous silicate tube through the inner surface, and simultaneously water vapor is diffused into the tube through the outer surface. The resultant thermal decomposition given by

$$2\ H_2O + Ge(OC_3H_7)_4 \longrightarrow GeO_2 + 4\ C_3H_{11}OH$$

yields a precipitate $GeO_2$ whose concentration in the pores varies radially decreasing as one goes to the outer surface. This tube is then heated very slowly to 950°C. It is kept at this temperature until it becomes transparent which indicates consolidation and is drawn into a fiber.

EXAMPLE 5

This example relates to depositing a dopant by formation of a precipitate by reaction of two solutions within the pores of a preform. High purity $Al_2O_3$ which may have been purified by gas chromatography as in Example 2, is dissolved in NaOH. The solution is fed into a porous tube. A dilute solution of HCl is placed around the outside of the tube. As the two solutions come into contact in the pores $Al(OH)_3$ precipitates. By controlling the hydrostatic pressure differences and the concentrations as a function of time, the radial variation of dopant can be controlled. Once the desired dopant concentration is achieved, 10 mole percent $Al_2(OH)_3$, then the preform is washed first with dilute HCl to remove all sodium ions left, then with distilled water which has been cleaned of all scattering particles by passing through a millipore filter. The preform is then ready for drying, closing the pores, consolidating and pulling into a fiber.

Although presently preferred embodiments of the invention have been shown and described with particularity, it would be appreciated that various changes and modifications may suggest themselves to those of ordinary skill in the art upon being apprised of the present invention. It is intended to encompass all such changes and modifications as fall within the scope and spirit of the appended claims.

We claim:

1. In a method for the production of an optical wave guide comprising a cladding layer and a glass core with an index of refraction larger than the index of refraction of said cladding layer, the improvement comprising forming said core by heat treating a base glass which is separable into at least a soluble phase and an insoluble phase to cause phase separation, leaching out the soluble phase and impurities to obtain an porous glass, thermally consolidating the glass to seal said pores, drawing the resultant glass into a fiber, and applying a cladding layer to produce said wave guide.

2. A method according to claim 1, wherein said base glass contains a finite amount of germania sufficient to increase the index of refraction of the resulting core.

3. In a method for the production of an optical wave guide from a phase separable base glass where the base glass is heat treated to cause phase separation into at least two immiscible liquids comprising an insoluble phase and a soluble phase, and the soluble phase is leached out, the improvement which comprises heating said insoluble phase to substantially completely remove chemically combined water therefrom, thermally consolidating the glass at a higher temperature to seal said pores, and applying a cladding layer to produce said wave guide.

4. A method according to claim 3, wherein said heating step is carried out at about 100°-300°C below the thermal consolidation temperature.

5. In a method for the production of an optical wave guide from a phase separable base glass including heat treating said base glass to cause phase separation into at least two immiscible liquids comprising an insoluble phase and a soluble phase, and leaching out the soluble phase, the improvement which comprises oxidizing transition metal impurities in the base glass to their highest oxidation states prior to phase separation, thermally consolidating the glass to seal the pores in said glass, and applying a cladding layer to produce said wave guide.

6. In a method for the production of an optical wave guide from a phase separable base glass including heat treating said base glass to cause phase separation into at least two immiscible liquids comprising an insoluble phase and a soluble phase, and leaching out the soluble phase, the improvement which comprises treating a porous glass having interconnected pores resulting from the leaching step to change the oxidation state of at least one transition metal impurity present therein, thermally consolidating the glass to seal the pores in said glass, and applying a cladding layer to produce said wave guide.

7. A method according to claim 6, wherein said impurity is present in the matrix of the porous glass.

8. A method according to claim 6, wherein said impurity is present in a dopant deposited in the pores of the porous glass.

9. In a method for the production of an optical wave guide from a phase separable base glass including heat treating said base glass to cause phase separation into at least two immiscible liquids comprising an insoluble phase and a soluble phase, and leaching out the soluble, the improvement which comprises removing from within the pores of the insoluble phase colloidal silica or colloidal germania produced as a decomposition product of the removed soluble phase during the leaching step, thermally consolidating the glass to seal the pores in said glass, and applying a cladding layer to produce said wave guide.

10. In a method for producing an optical wave guide fiber wherein a preform is drawn to produce the fiber, the improvement which comprises producing a preform of a porous silicate or germinate glass having interconnected pores therethrough, radially non-uniformly depositing a dopant capable of varying the index of refraction of said glass within said pores to vary the index of refraction, and thermally consolidating the glass to seal the pores, whereby when a fiber is drawn from said preform, the fiber has an index of refraction which varies radially.

11. In a method according to claim 10, wherein said preform is a borosilicate glass.

12. In a method according to claim 10, further comprising heating said glass to produce from said dopant at least one oxide selected from the group consisting of alkali metal oxides, alkaline earth oxides, boric oxide, germania, alumina, titanium dioxide, lead oxide, and bismuth oxide.

13. In a method according to claim 12, wherein the oxide is germania deposited in the pores in an amount of about 5-30 weight percent based on the initial weight of the preform.

14. In a method according to claim 10, wherein said dopant is deposited within said pores by regulated diffusion of dopant into the pores of said preform.

15. In a method according to claim 10, wherein said dopant is deposited within said pores by precipitating dopant from a solution into the pores of said preform.

16. In a method according to claim 10, wherein said dopant is deposited within said pores by chemical vapor deposition.

17. In a method according to claim 10, wherein said dopant is deposited by placing dopant within pores adjacent the surface of the preform, and heating the preform to diffuse a portion of the dopant throughout the remainder of the preform.

18. In a method according to claim 10, wherein the dopant is deposited by initially distributing dopant relatively uniformly throughout said preform, said dopant being one which increases the index of refraction, and selectively leaching a portion of the dopant from the preform so that the concentration of dopant increases towards the center of the preform.

19. In a method according to claim 10, wherein said glass is a porous silicate glass and wherein said dopant contains thallium, and further comprising drawing said preform to produce a fiber, ion exchanging the doped fiber with ions selected from the group consisting of sodium and potassium ions to replace a portion of said dopant with said ions to obtain a fiber whose index of refraction increases radially inwardly from the outer surface thereof.

20. A method according to claim 10, wherein said dopant contains lithium.

21. A method according to claim 19, wherein said porous silicate glass is a borosilicate glass, and wherein the fibers are ion exchanged by passing the fiber through a molten salt bath containing the sodium or potassium ions in a continuous fashion immediately following the drawing step.

22. In a method for the production of an optical wave guide comprising a cladding layer and a glass core with an index of refraction larger than the index of refraction of said cladding layer, wherein the improvement comprises forming said cladding layer of a porous silicate glass having interconnected pores therethrough, depositing a dopant within said pores to control the index of refraction of said cladding layer, and thermally consolidating the glass to seal the pores.

23. In a method according to claim 22, further comprising heating said glass to produce from said dopant an oxide selected from the group consisting of alkali metal oxides, alkali earth oxides, boric oxide, germania, alumina, titanium dioxide, lead oxide, bismuth oxide, ceric oxide, and cerous oxide.

24. In a method according to claim 22, wherein the core is fused silica, and wherein the dopant is boric oxide in an amount of about 1-30 weight percent based on the initial weight of the preform.

25. In a method according to claim 22, wherein said core is a porous silicate glass having interconnected pores therethrough, and further comprising depositing a dopant different from the dopant in the cladding layer into the pores of the porous glass of the core, and thereafter uniting the cladding layer and the core.

26. In a method for the production of an optical wave guide comprising a cladding layer and a glass core with an index of refraction larger than the index of refraction of said cladding layer, wherein the improvement comprises forming said core of a porous silicate glass having interconnected pores therethrough, depositing a dopant within said pores to control the index of refraction of said core and thermally consolidating said core to close the pores.

27. A method according to claim 26, wherein said dopant elevates the index of refraction of said core and is selected from the group consisting of alkali metal oxides, alkali earth oxides, germania, alumina, titanium oxide, cerous oxide, and ceric oxide.

28. In a method of producing an optical wave guide, the improvement which comprises producing the wave guide of a porous silicate or germinate glass having interconnected pores therethrough, non-uniformly depositing a dopant within said pores, and thermally consolidating said pores in such a fashion that the wave guide has a non-uniform index of refraction which varies along a dimension of the wave guide.

29. In a method for the production of an optical wave guide comprising a cladding layer and a glass core with an index of refraction larger than the index of refraction of said cladding layer, wherein the improvement comprises forming said cladding layer of a porous silicate glass having interconnected pores therethrough, removing colloidal silica from within said pores to lower the index of refraction of said cladding layer, and then thermally consolidating said cladding layer to seal the pores.

* * * * *